(12) United States Patent
Durant et al.

(10) Patent No.: US 10,857,777 B2
(45) Date of Patent: Dec. 8, 2020

(54) SYSTEM AND METHOD FOR FORMING A DIAPHRAGM BY THREE-DIMENSIONAL PRINTING

(71) Applicant: EMERSON PROCESS MANAGEMENT REGULATOR TECHNOLOGIES, INC., McKinney, TX (US)

(72) Inventors: Tony A. Durant, McKinney, TX (US); James M. West, Dallas, TX (US); Madhusudhan Reddy Kotragouda Basappa, Frisco, TX (US); David O. Plummer, Irving, TX (US); Nathan A. Quinn, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 704 days.

(21) Appl. No.: 15/271,424

(22) Filed: Sep. 21, 2016

(65) Prior Publication Data
US 2017/0100886 A1    Apr. 13, 2017

Related U.S. Application Data

(60) Provisional application No. 62/240,065, filed on Oct. 12, 2015.

(51) Int. Cl.
| | | |
|---|---|---|
| *B29C 67/00* | (2017.01) | |
| *B33Y 10/00* | (2015.01) | |
| *B33Y 30/00* | (2015.01) | |
| *F16J 3/02* | (2006.01) | |
| *F16K 7/12* | (2006.01) | |
| *B33Y 80/00* | (2015.01) | |

(Continued)

(52) U.S. Cl.
CPC .............. *B33Y 30/00* (2014.12); *B29C 64/00* (2017.08); *B29C 64/106* (2017.08); *B29C 64/255* (2017.08); *B33Y 10/00* (2014.12); *B33Y 70/00* (2014.12); *B33Y 80/00* (2014.12); *F16J 3/02* (2013.01); *F16K 7/00* (2013.01); *F16K 7/12* (2013.01); *F16K 31/126* (2013.01)

(58) Field of Classification Search
None
See application file for complete search history.

(56) References Cited

U.S. PATENT DOCUMENTS

| | | | | |
|---|---|---|---|---|
| 1,892,022 | A | * 12/1932 | Tyler ..................... | F04B 53/143 92/244 |
| 3,291,005 | A | * 12/1966 | Anderson ................ | F16J 3/02 74/18.2 |

(Continued)

OTHER PUBLICATIONS

Rossiter, Jonathan, Peter Walters, and Boyko Stoimenov. "Printing 3D dielectric elastomer actuators for soft robotics." Electroactive Polymer Actuators and Devices (EAPAD) 2009. vol. 7287. International Society for Optics and Photonics, 2009.*

(Continued)

*Primary Examiner* — Matthew J Daniels
*Assistant Examiner* — Mohammad M Ameen
(74) *Attorney, Agent, or Firm* — Marshall, Gerstein & Borun LLP

(57) ABSTRACT

Systems, apparatus, and methods are directed toward manufacturing a diaphragm using three-dimensional printing techniques.

20 Claims, 1 Drawing Sheet

(51) Int. Cl.
*B33Y 70/00* (2020.01)
*B29C 64/106* (2017.01)
*F16K 31/126* (2006.01)
*B29C 64/00* (2017.01)
*F16K 7/00* (2006.01)
*B29C 64/255* (2017.01)

(56) References Cited

U.S. PATENT DOCUMENTS

| | | | | |
|---|---|---|---|---|
| 2003/0183982 | A1* | 10/2003 | Jansen | A61F 2/2415 |
| | | | | 264/259 |
| 2004/0199139 | A1* | 10/2004 | Fowles | A61J 1/1406 |
| | | | | 604/414 |
| 2007/0286682 | A1* | 12/2007 | Freyer | F16L 55/132 |
| | | | | 405/184.1 |
| 2015/0276528 | A1 | 10/2015 | Willcox | |

OTHER PUBLICATIONS

International Preliminary Report on Patentability for International application No. PCT/US2016/056490, dated Apr. 17, 2018.
Written Opinion for International application No. PCT/US2016/056490, dated Apr. 17, 2018.
Rossiter et al., "Printing 3D dielectric elastomer actuators for soft robotics", SPIE—International Society for Optical Engineering. Proceedings, vol. 7287, Mar. 26, 2009 (Mar. 26, 2009), pp. 72870H1-72870H-10, XP055373302, US ISSN: 0277-786X, DOI: 10.1117/12.815746 ISBN: 978-1-5106-0753-8.

* cited by examiner

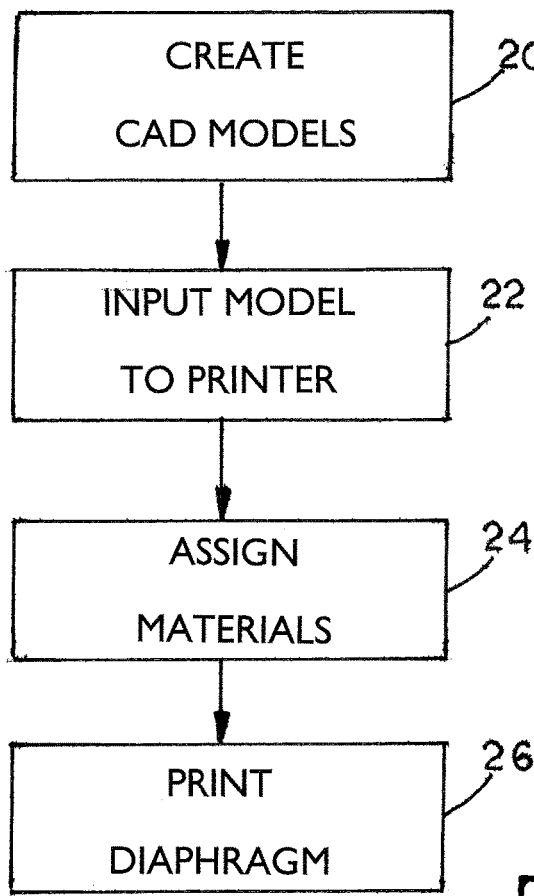
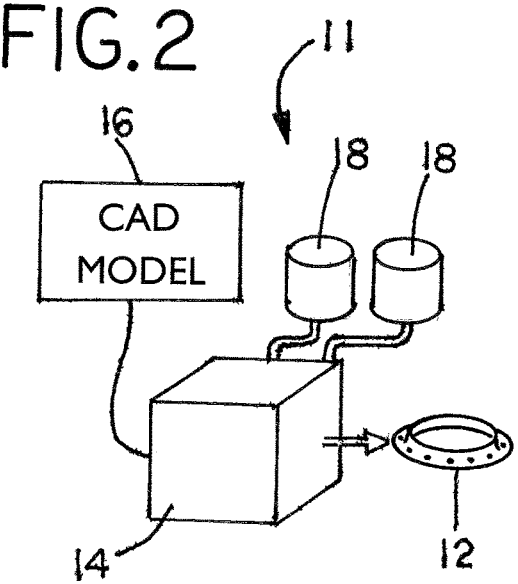
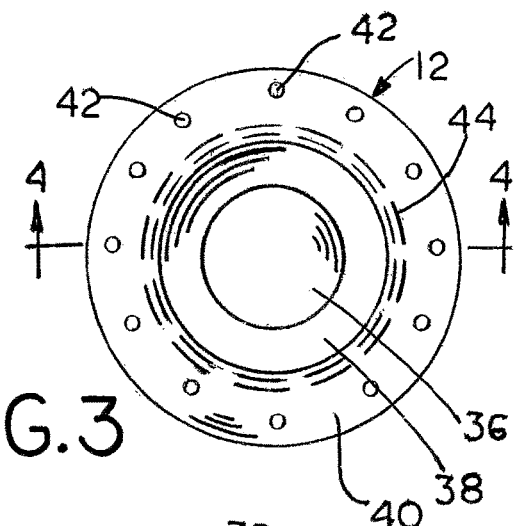
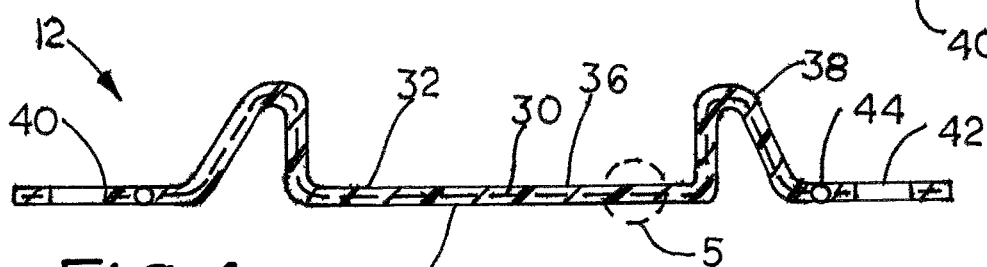
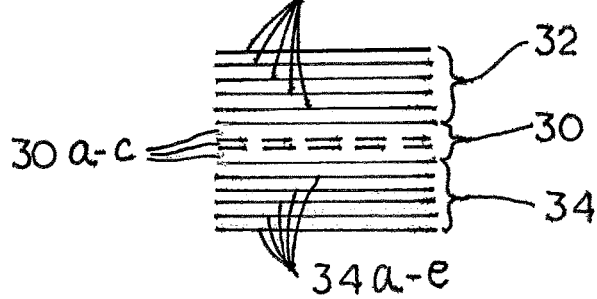

US 10,857,777 B2

SYSTEM AND METHOD FOR FORMING A DIAPHRAGM BY THREE-DIMENSIONAL PRINTING

This application claims the benefit of Provisional U.S. Application No. 62/240,065, filed Oct. 12, 2015, which is incorporated by reference herein in its entirety.

FIELD

This application relates generally to a system and method for manufacturing a diaphragm with a three-dimensional printer.

BACKGROUND

Many actuators for industrial and other types of valves include a diaphragm to sense and/or react to changes in pressure inside the actuator or valve so as to control the valve. The diaphragms can wear over time and/or use cycles and may need to be changed or replaced. In addition, sometimes it may be desirable to change the diaphragm from one type to a different type. In either case, changing or repairing the diaphragm requires the actuator and/or the valve to be taken apart, which causes the valve to be inoperable for some period of time.

Many valves are installed in industrial process systems in which down time needs to be minimized. Therefore, maintenance on a valve that makes the valve inoperable, such as changing out the diaphragm, often needs to be performed as quickly as possible to minimize the down time of the valve, and consequently the associated process system. Common processes for manufacturing diaphragms, such as molding, forming, or over-molding, however, typically have costly tooling and long lead time requirements before the first diaphragm is ever produced. Therefore, when planning and implementing maintenance on a valve in an industrial process line that includes possibly changing out an actuator diaphragm, it is usually necessary to have a diaphragm already selected, ordered, and available prior to disassembling the actuator.

Unfortunately, it is not always possible to have the necessary lead time for obtaining a diaphragm. For example, if a valve actuator unexpectedly requires a new diaphragm prior to a planned maintenance shut down, or if it unexpectedly becomes apparent that a non-standard diaphragm needs to be installed only after the actuator has been disassembled, then there may not be enough time to obtain the needed diaphragm due to the long lead time to obtain the desired diaphragm. In this case, it would be desirable to have a way to obtain a diaphragm, and in particular, a non-standard diaphragm, without having to wait for the tooling and lead times currently standard in the industry.

SUMMARY

The present disclosure provides systems, apparatus, and methods that, in some arrangements, are directed toward manufacturing a diaphragm using three-dimensional (3-D) printing techniques or similar additive manufacturing techniques.

According to some aspects of the disclosure, a method of manufacturing a diaphragm for use in an actuator includes forming at least a portion of the diaphragm with a three-dimensional printer. The entire diaphragm may be formed with a three-dimensional printer or only some portions of the diaphragm may be formed with a three-dimensional printer. This has the advantage of being able to form a diaphragm quickly and reduce or even eliminate extended lead times for obtaining a diaphragm and/or reduce tooling costs for production of a diaphragm. Such a method may be useful in research, development, production, and maintenance phases by significantly reducing the wait time and expense to produce a diaphragm, and in particular, non-standard diaphragms.

In some arrangements, two or more materials may be printed simultaneously while manufacturing a diaphragm. In this manner, purely a first material may be printed, purely a second material may be printed, or a gradient of the first and second materials may be printed. Similarly, if three or more materials are printed, any one of the materials may be printed pure and/or various gradient combination of any two or more of the materials may be printed. The first material may have a higher flexibility and a lower tensile strength, similar to a rubber, and the second material may have a higher tensile strength and a lower flexibility, similar to a fabric. The first material may have a first elasticity, and the second material may have a second elasticity different than the first elasticity. During the printing process, the materials may be fused and cured together at a microscopic scale. This may allow diaphragms of a near infinite variety of materials and/or structures to be made relatively quickly and inexpensively.

In some arrangements, an infrastructure may be geometrically designed and incorporated. This may be used, for example, to maximize flexibility and/or strength characteristics of the diaphragm at a macroscopic level. This may also allow diaphragms of a near infinite variety of mechanical characteristics be made relatively quickly and inexpensively.

According to some aspects, a system for manufacturing a flexible diaphragm for an actuator may include a three-dimensional printer and a three-dimensional model of the flexible diaphragm for being accessed by the 3-D printer so that the 3-D printer can manufacture the flexible diaphragm from the 3-D model. In some arrangements, the 3-D printer can print using two or more materials. For example the 3-D printer may include two or more print cartridges. Each cartridge may contain a different material. Each material may provide different mechanical characteristics to the flexible diaphragm. In this manner, the system can manufacture a flexible diaphragm having multiple different materials and/or mechanical properties in different regions.

Any one or more of these aspects may be combined with any one or more of the other aspects and/or additional aspects, arrangements, features, and/or technical effects that are apparent upon detailed inspection of the figures and the following description.

BRIEF DESCRIPTION OF THE DRAWINGS

FIG. 1 is a flow diagram of a method according to an aspect of the present disclosure;

FIG. 2 is a diagrammatic illustration of a 3-D printing system for printing a diaphragm according to an aspect of the disclosure;

FIG. 3 is a top plan view of a diaphragm according to an aspect of the present disclosure;

FIG. 4 is a diametric cross-sectional view of the diaphragm of FIG. 3; and

FIG. 5 is an enlarged detail cross-sectional view of the circled portion of the diaphragm in FIG. 4.

DETAILED DESCRIPTION

Methods and systems according to the present disclosure may have many different aspects, arrangements, and features in many different various combinations. Any one or more of the aspects, arrangements, and features disclosed herein may be combined with any one or more of the other aspects, arrangements, and features in any way suitable for providing any one or any combination of technical aspects in any useful manner.

According to some aspects, a method of manufacturing a flexible diaphragm for use in an actuator is disclosed. The method may include forming at least a portion of the flexible diaphragm with a three-dimensional printer. The entire flexible diaphragm may be formed with a three-dimensional printer. Less than the entire flexible diaphragm may be formed with a three-dimensional printer. The flexible diaphragm may include a plurality of plies, and the step of forming may include forming the first ply of the flexible diaphragm from a first material and/or forming the second ply of the flexible diaphragm from a second material. A ply of the flexible diaphragm may include a plurality of layers, and the step of forming may include forming a first area of a first layer from a first material and/or forming a second area of the first layer from a second material. The first material may have a first characteristic, and the second material may have a second characteristic. The first material may have a first elasticity, and the second material may have a second elasticity. The first material may be more flexible than the second material. The second material may have a higher tensile strength than the first material. The flexible diaphragm may be formed of at least one of a plastic material and an elastomer material.

According to some aspects, forming the diaphragm may include creating a computer readable three-dimensional model of the diaphragm. Forming the diaphragm may include loading the three-dimensional model to the three-dimensional printer. Forming the diaphragm may include assigning one or more materials to be used to print the diaphragm. Forming the diaphragm may include printing the diaphragm with the three-dimensional printer from the three-dimensional model and the assigned materials. Forming the diaphragm may include printing a first portion of the flexible diaphragm to form flexible body. Forming the diaphragm may include printing a second portion of the flexible diaphragm to form a reinforcement member. The first portion may be formed with an elastomeric material, and the second portion may be formed with a plastic material. The reinforcement member may include a reinforcement ring surrounding a central region of the flexible body. The flexible body may include at least one continuous ply, and/or the reinforcement member comprises at least one discontinuous ply.

According to some aspects, the method may include obtaining specifications for the diaphragm from a valve actuator. The method may include creating the three-dimensional model based on the obtained specifications. Obtaining the specifications may be performed after the valve actuator has been installed in a process piping line. Obtaining the specifications may include temporarily shutting down any processes run through the process piping line and/or at least partly disassembling the valve actuator.

According to some aspects, a system for manufacturing a flexible diaphragm for an actuator is provided. The system may include a three-dimensional model of the flexible diaphragm. The system may include a three-dimensional printer including a print cartridge of material for forming the flexible diaphragm and a computer processor that controls deposition of material from the print cartridge in response to the three-dimensional model. The three-dimensional model may be accessed by the three-dimensional printer such that the three-dimensional printer can manufacture the flexible diaphragm from the three-dimensional model. The three-dimensional model may be accessed, for example, by uploading directly to the 3-D printer or by being stored in an electronic memory separate from the 3-D printer and being accessed by the 3-D printer. The three-dimensional printer may be arranged to print with two or more different materials. For example, the 3-D printer may include at least a second print cartridge. The first print cartridge may contain a first material, and the second print cartridge may contain a second material. The three-dimensional model may define at least two volumes to be formed of different materials. The printer preferably is able to manufacture the flexible diaphragm with a first region formed of the first material corresponding to a first one of the volumes, and a with a second region formed of the second material corresponding to a second one of the volumes.

Turning now to specific examples of the drawings, FIGS. 1 and 2 illustrate a method 10 and a system 11 for manufacturing a diaphragm 12 with a 3-D printer 14 according to some aspects of the present disclosure. The diaphragm 12 may be a diaphragm for use in a valve actuator, such as for an industrial valve, or for another type of valve. Many types of 3-D printers are available that are capable of being used to print a diaphragm in accordance with the present disclosure. One exemplary 3-D printer that may be used is the Objet500 Connex™ available from Stratasys Ltd. However, any 3-D printer that is adapted and arranged to form a three-dimensional object using plastic and/or elastomer materials based on a 3-D computer readable model to form the structures and features of the diaphragms could be used, and the particular make or model of 3-D printer is not particularly relevant to the present disclosure. In addition, the specific type of 3-D printing method may vary along with the 3-D printer. The 3-D printer 14 may include or be operatively connected to a computer processor that is arranged to drive various mechanical parts, such as print heads, support surface, print cartridges, and so on, based on the 3-D model 16 and the assigned materials in any manner now or in the future available in the art. The 3-D printer 14 may access the 3-D model 16 by any arrangement suitable for directing the computer processor in a manner to form the diaphragm 12 with the 3-D printer 14. For example, the 3-D model 16 may be uploaded to an electronic memory of the 3-D printer, or the 3-D model 16 may be stored in an electronic memory remote from the 3-D printer 14 and accessed via a data communication link. Preferably, the 3-D printer 14 can print with multiple different materials simultaneously. For example, the 3-D printer 14 may have a plurality of different print cartridges 18, wherein each cartridge may contain a different print material, such as a polymer or an elastomer, so that the 3-D printer 14 can print with multiple materials to form a diaphragm 12 with different materials therein.

The method 10 includes creating a 3-D model 16 of the diaphragm 12, as illustrated at block 20. The 3-D model 16 is readable and usable by a computer program for controlling the 3-D printer 14 in any manner understood in the art. The 3-D model 16 may be, for example, a digital file created by a computer aided drafting (CAD) program. The 3-D model 16 preferably defines the entire volume of the diaphragm 12, including any boundaries between volumes of different materials and/or mechanical characteristics. For example, the 3-D model 16 may model the diaphragm 12, which has various features. In this example, the diaphragm 12 has top and bottom surfaces with a generally circular peripheral edge and a generally thin side profile extending diametrically through the diaphragm. The diaphragm includes a reinforcement ply 30 sandwiched between an upper ply 32 and a lower ply 34. Each of the plies 30, 32, and 34 extends substantially entirely across circular surface area of the diaphragm 12. In addition, the diaphragm 12 has a central region 36, a bellows region 38 (which is also called a convolution) surrounding the central region, and a peripheral region 40 surrounding the central region. An inner periphery of the bellows region 38 is connected with the outer periphery of the central region 36, and the outer periphery of the bellows region 38 is connected to the inner periphery of the peripheral region 40. The central region 36 has a relatively flat profile and/or surface and forms a tympanic-like membrane to sense and/or move in response to pressure variations on the top and/or bottom side. The upper ply 32 and the lower ply 34 may form a flexible body capable of moving in response to the pressure variations. The bellows region 38 is an undulating profile that allows the central region 36 to move up and/or down relative to the peripheral region 40. The peripheral region 40 has a flat profile and may include a number of bolt holes 42 therethrough spaced around the peripheral region. The peripheral region 40 is customarily for attaching the diaphragm 12 to an actuator housing. A reinforcement ring 44 may also be embedded in or between the upper and lower plies 32 and 34 between the bolt holes 42 and the bellows region 38. All of these features (such as 30-44) of the diaphragm are modeled as various volumes in the 3-D model with surfaces that delineate the shape of the feature.

The method 10 includes providing the 3-D model 16 to a 3-D printer 14, as illustrated at block 22. The 3-D model 16 may be provided to the 3-D printer 14 in any way suitable for transferring electronic data, for example, with a wired connection, a wireless data link, internet link, with a readable memory, etc. The 3-D model 16 may be transferred directly to the 3-D printer 14 and/or the 3-D model 16 may be stored separate from the 3-D printer 14 and accessed remotely by the 3-D printer.

The method 10 includes assigning materials to one or more volumes of the 3-D model to printing one or more regions and/or volumes of the diaphragm with the assigned materials at block 24. One or more or all of the positive features (e.g., 30, 32, 34, 36, 38, 40, and 44) may be formed with a material that is to be dispensed by the 3-D printer 14. Some or all of the features 30-40 and 44 may be formed of different materials or a different mixture of materials. The different materials may have different characteristics. A first material may have a first characteristic, such as having a first elasticity and/or tensile strength, and a second material may have a second characteristic, such as having a second elasticity and/or tensile strength. More than two different materials might also be used if desired. However, in some cases, some or all of the features 30-44 may be formed of the same material. In any event, a material or mixture of materials is assigned to each of the various volumes of the 3-D model that define the various features 30-44. Assigning materials to volumes (or features) may be done, for example, by inputting such assignments directly at the 3-D printer 14, with the 3-D model 16, or any other effective way. In addition, although assigning materials is illustrated as coming after the block 20, assigning materials may come at any time prior to printing the diaphragm. Of course, the diaphragm 12 is only exemplary, and additional, different, and/or fewer features may be formed into a diaphragm to be manufactured with a 3-D printer according to the present disclosure, and the principles of this disclosure are applicable to such different diaphragms as well.

The method 10 includes printing the diaphragm 12 with the 3-D printer 14 at block 26. The 3-D printer 14 may print based on any of various additive manufacturing techniques that have already been developed or may be developed in the future. Many such additive manufacturing techniques build up a 3-D object, such as the diaphragm 12 in this case, by forming multiple layers of material on top of each other. Thus, in the profile of the diaphragm 12 (in the central region, for example), each positive feature of the diaphragm may be formed of a number of individual layers of material, wherein each layer is formed by a single pass of a print head of the 3-D printer. For example, as illustrated in FIG. 5, each of the reinforcement ply 30, the upper ply 32, and the lower ply 34 may be formed of a plurality of separate layers of material, such as layers 30a-c of the reinforcement ply 30, layers 32a-e of the upper ply 32, and layers 34a-e of the lower ply 34.

The plies 30, 32, and 34 may be formed of different materials, such as elastomeric materials or plastic materials. For example, the upper and/or lower plies 32 and 34 may be formed of an elastomeric material, and the reinforcement ply 30 may be formed of a plastic material.

Each of these layers 30a-c, 32a-e, and 34a-e may be formed of different materials at different areas of the layer. In this way, the 3-D printer 14 may form the diaphragm 12 such that different regions of a particular ply have different mechanical properties. For example, the upper ply 32 may be formed with a first material within the central region 36, such as a highly elastic material, and with a second material in the peripheral region 40, such as a more plastic material. In this way, 3-D printing the diaphragm with multiple materials allows production of a diaphragm with multiple materials and mechanical characteristics within a single ply.

Each of the plies 30, 32, and 34 may be formed of layers of different materials. For example, layers 32a, 32c, and 32e of the upper ply 32 may be formed of a first elastomeric material and layers 32b and 32d may be formed of a second elastomeric material. Other arrangements of different layers being formed of different materials is also possible.

The different features of the diaphragm 12 may be formed of different materials to provide different mechanical characteristics. For example, the upper ply 32 and the lower ply 34 may be formed of a highly flexible material, such as a neoprene or silicone rubber or similar material, which may be good for sensing and moving in reaction to changes in pressure at the central region 36. The reinforcement ply 30 may be made of a stronger, less flexible material, such as poly-vinyl chloride or similar material, to provide a strong network to hold the shape of the diaphragm 12. The reinforcement ring 44 may be formed of yet another material that is very stiff and strong, such as poly-vinyl chloride or similar material.

The different features of the diaphragm 12 may be formed with different physical characteristics to provide different mechanical qualities. The reinforcement ply 30 may be modeled and printed to form or simulate a fabric, for example having a non-continuous volume with macroscopic voids that might approximate a woven or non-woven fabric. The upper ply 32 and the lower ply 34 may be modeled and printed to provide a substantially air impervious barrier between the top and bottom sides, for example having a continuous volume without macroscopic voids. The reinforcement ring may be modeled and printed so as to have a very dense structure to form a strong reinforcement feature to be accepted in and prevent pullout from a groove, for example.

According to some aspects, the entire diaphragm 12 may be printed with the 3-D printer 14. For example, each of the features 30-40 and 44 may be formed by printing with the 3-D printer 14. According to other aspects, less than the entire diaphragm 12 may be formed with the 3-D printer 14. In other words, some of the features 30-40 and 44 may be formed by printing with the 3-D printer while others of the features are formed in a different manner. For example, the reinforcement ply 30 could be a pre-formed fabric that is embedded onto the previously printed lower ply 34 and the upper ply 42 might thereafter be printed directly over the top of the reinforcement ply. Similarly, the reinforcement ring 44 could be a pre-formed metal ring that is embedded onto the already printed lower ply 34 and the upper ply 32 might thereafter be printed over the top of the reinforcement ring.

A benefit of the method and system disclosed herein may be the ability to quickly obtain a diaphragm for a valve actuator that has already been installed along a process pipe line. Such an ability may be particularly useful during a maintenance shutdown of a process line, for example. In this scenario, the method 10 may also include obtaining desired or necessary specification for the diaphragm 12 from the valve actuator itself prior to or in conjunction with creating the 3-D model. This may be done by obtaining measurements or other survey information of the valve actuator and/or the current diaphragm after the valve actuator has been opened up in the field. For example, once the process line has been shut down and isolated, the already installed valve actuator may be at least partially disassembled until the diaphragm is accessible. Then, measurements and/or other specifications for a replacement diaphragm may be obtained directly from the partially disassembled valve actuator while the valve is still installed along the pipeline. Of course, these measurements could also be obtained with the valve uninstalled from the pipeline if desired. Thereafter, creating the three-dimensional model 16 may be based on the specifications obtained from the survey of the valve actuator. In this way, the disclosed method and system can also enable rapid prototyping and/or formation of nearly any type of diaphragm on the fly, for example, during a maintenance shutdown, which may provide significant additional flexibility to install and replace used diaphragms in a manner heretofore not possible.

Similarly, the methods and systems disclosed herein may allow rapid prototyping of diaphragms that could significantly speed up current research and development cycles while trying to develop new diaphragm designs.

This detailed description is to be construed as exemplary only and does not describe every possible embodiment or combination, as describing every possible embodiment and combination would be impractical, if not impossible. One could implement numerous alternate embodiments and combinations, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

We claim:

1. A method of manufacturing a flexible diaphragm for use in an actuator, comprising:
    forming at least a portion of the flexible diaphragm with a three-dimensional printer, wherein the flexible diaphragm includes an upper ply and a lower ply, wherein the step of forming the flexible diaphragm comprises:
        forming a central region from a first material;
        forming a bellows region connected to and surrounding the central region from the first material or a second material different from the first material; and
        forming a peripheral region connected to and surrounding the bellows region from the second material, wherein the peripheral region comprises a plurality of bolt holes extending therethrough; and
    embedding a reinforcement ring between the bellows region and the plurality of bolt holes, such that the reinforcement ring surrounds the central region, the reinforcement ring formed of a third material that is stiffer than the first material and the second material,
    wherein the reinforcement ring is embedded between the upper ply and the lower ply.

2. The method of claim 1, wherein the entire flexible diaphragm is formed with the three-dimensional printer.

3. The method of claim 1, wherein less than the entire flexible diaphragm is formed with the three-dimensional printer.

4. The method of claim 1, wherein the step of forming includes:
    forming the upper ply with the first material within the central region of the flexible diaphragm; and
    forming the upper ply with the second material within the peripheral region of the flexible diaphragm.

5. The method of claim 1, wherein the upper ply and/or the lower ply of the flexible diaphragm comprises a plurality of layers, and the step of forming includes:
    forming the central region of a first layer from the first material;
    forming the bellows region of the first layer; and
    forming the peripheral region of the first layer from the second material.

6. The method of claim 1, wherein the first material has a first characteristic and the second material has a second characteristic.

7. The method of claim 1, wherein the first material has a first elasticity and the second material has a second elasticity.

8. The method of claim 1, wherein the first material is more flexible than the second material.

9. The method of claim 1, wherein the second material has a higher tensile strength than the first material.

10. The method of claim 1, wherein the first material comprises an elastomer material and the second material comprises a plastic material.

11. The method of claim 1, wherein the step of forming comprises:
    creating a computer readable three-dimensional model of the flexible diaphragm;
    loading the three-dimensional model to the three-dimensional printer;
    assigning one or more materials to be used to print the flexible diaphragm; and
    printing the flexible diaphragm with the three-dimensional printer from the three-dimensional model and the assigned materials,
    wherein the step of printing comprises:
        printing the central region from the first material,
        printing the bellows region from the first material or the second material; and
        printing the peripheral region from the second material.

12. The method of claim 1, wherein the step of forming comprises:

printing a first portion of the flexible diaphragm to form a flexible body; and printing a second portion of the flexible diaphragm to form the reinforcement ring.

13. The method of claim 12, wherein the first portion is formed with an elastomeric material, and the second portion is formed with a plastic material.

14. The method of claim 12, wherein the flexible body comprises at least one continuous ply and the reinforcement ring comprises at least one discontinuous ply.

15. The method of claim 1, further comprising:

obtaining specifications for the diaphragm from a valve actuator; and creating the three-dimensional model based on the obtained specifications.

16. The method of claim 15, wherein the step of obtaining is performed after the valve actuator has been installed in a process piping line.

17. The method of claim 16, wherein the step of obtaining includes the step of temporarily shutting down any processes run through the process piping line.

18. A method of manufacturing a flexible diaphragm for use in an actuator, comprising:

obtaining a computer readable three-dimensional model of the flexible diaphragm at a three-dimensional printer including one or more print cartridges of materials for forming the flexible diaphragm; and forming at least a portion of the flexible diaphragm with the one or more print cartridges using the computer readable three-dimensional model, wherein the step of forming comprises:

forming a central region with a first material from a first print cartridge of material;

forming a bellows region connected to and surrounding the central region with the first material or a second material from a second print cartridge of material, the second material being different from the first material; and forming a peripheral region connected to and surrounding the bellows region with the second material, the peripheral region comprising a plurality of bolt holes extending therethrough; and embedding a reinforcement ring between the bellows region and the plurality of bolt holes, such that the reinforcement ring surrounds the central region, the reinforcement ring formed of a third material that is stiffer than the first material and the second material, wherein the reinforcement ring does not extend beyond the plurality of bolt holes.

19. A method of manufacturing a flexible diaphragm for use in an actuator, comprising:

forming at least a portion of the flexible diaphragm with a three-dimensional printer, wherein the flexible diaphragm comprises a plurality of plies and the step of forming comprises:

creating a computer readable three-dimensional model of the flexible diaphragm;

loading the three-dimensional model to the three-dimensional printer;

assigning one or more materials to be used to print the flexible diaphragm; and printing the flexible diaphragm with the three-dimensional printer from the three-dimensional model and the assigned materials, and wherein the step of printing comprises:

printing a lower ply of the plurality of plies;

embedding a reinforcement ring onto the lower ply; and after the embedding, printing an upper ply of the plurality of plies on top of the reinforcement ring, such that the reinforcement ring is embedded between the upper ply and the lower ply, and wherein the flexible diaphragm comprises a central region, a bellows region connected to and surrounding the central region, and a peripheral region connected to and surrounding the bellows region, the peripheral region comprising a plurality of bolt holes extending therethrough, and wherein the reinforcement ring is embedded between the bellows region and the plurality of bolt holes, such that the reinforcement ring surrounds the central region.

20. The method of claim 19, wherein the upper ply is formed with a first material within the central region and with a second material in the peripheral region.

* * * * *